(12) United States Patent
Krishnamurthy et al.

(10) Patent No.: US 8,483,707 B2
(45) Date of Patent: Jul. 9, 2013

(54) WIRELESS TERMINAL AND METHOD FOR MANAGING THE RECEIPT OF POSITION REFERENCE SINGALS FOR USE IN DETERMINING A LOCATION

(75) Inventors: Sandeep H Krishnamurthy, Arlington Heights, IL (US); Colin D Frank, Park Ridge, IL (US); Kenneth A Stewart, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 203 days.

(21) Appl. No.: 12/492,339

(22) Filed: Jun. 26, 2009

(65) Prior Publication Data

US 2010/0331009 A1     Dec. 30, 2010

(51) Int. Cl.
*H04W 24/00* (2009.01)
(52) U.S. Cl.
USPC .......... 455/456.1; 455/456.2; 455/456.3; 455/456.4; 455/456.5; 455/456.6; 370/344; 370/329; 370/330; 370/320; 370/345
(58) Field of Classification Search
USPC ............... 455/456.1–456.6; 370/344, 329, 370/330, 320, 345, 235
See application file for complete search history.

(56) References Cited

U.S. PATENT DOCUMENTS

| | | | |
|---|---|---|---|
| 4,631,543 A | 12/1986 | Brodeur | |
| 7,639,660 B2 | 12/2009 | Kim et al. | |
| 7,649,831 B2 | 1/2010 | Van Rensburg et al. | |
| 7,940,740 B2 | 5/2011 | Krishnamurthy et al. | |
| 2001/0034238 A1 | 10/2001 | Voyer | |
| 2003/0222819 A1 | 12/2003 | Karr et al. | |

(Continued)

FOREIGN PATENT DOCUMENTS

| | | |
|---|---|---|
| WO | 9921389 A1 | 4/1999 |
| WO | 2007052115 A2 | 5/2007 |

(Continued)

OTHER PUBLICATIONS

3GPP TSG-RAN WG1 #56; Feb. 9-13, 2009; Athens, Greece; PHY Layer Specification Impact of Positioning Improvements; R1-090852.

(Continued)

*Primary Examiner* — Anthony Addy
*Assistant Examiner* — Yousef Rod (57) ABSTRACT

The present invention provides for wireless terminal and a method in a wireless terminal for use in a location determination approach using time of arrival estimates between the wireless terminal and a plurality of base stations in a cellular network. The method includes receiving assistance data from a serving base station for use in receiving a position reference signal used to determine a time of arrival of one or more respective position reference signals from the plurality of base stations relative to a time reference, wherein the assistance data includes a list of base stations, each base station included in the list to be one of used or excluded from use as part of the plurality of base stations for receiving the position reference signal and determining the time of arrival estimate for the received position reference signal. The position reference signal is then received for each of the plurality of base stations, where for each of the plurality of base stations a time of arrival estimate is determined for each of the respective received position reference signals. The time of arrival estimates for each of the plurality of base stations is then forwarded to a location determination entity.

23 Claims, 8 Drawing Sheets

U.S. PATENT DOCUMENTS

| | | | |
|---|---|---|---|
| 2005/0134456 A1* | 6/2005 | Niu et al. | 340/539.23 |
| 2005/0135324 A1 | 6/2005 | Kim et al. | |
| 2006/0019677 A1 | 1/2006 | Teague et al. | |
| 2006/0209754 A1 | 9/2006 | Ji et al. | |
| 2006/0256887 A1 | 11/2006 | Kwon et al. | |
| 2006/0291393 A1 | 12/2006 | Teague et al. | |
| 2007/0008108 A1 | 1/2007 | Schurig et al. | |
| 2007/0049280 A1 | 3/2007 | Sambhwani et al. | |
| 2007/0133462 A1 | 6/2007 | Guey | |
| 2007/0153743 A1 | 7/2007 | Mukkavilli et al. | |
| 2007/0223422 A1 | 9/2007 | Kim et al. | |
| 2007/0280160 A1 | 12/2007 | Kim et al. | |
| 2008/0014960 A1 | 1/2008 | Chou | |
| 2008/0089312 A1 | 4/2008 | Malladi | |
| 2008/0095109 A1 | 4/2008 | Malladi et al. | |
| 2008/0132247 A1 | 6/2008 | Anderson | |
| 2008/0133462 A1 | 6/2008 | Aylward et al. | |
| 2008/0159239 A1 | 7/2008 | Odlyzko et al. | |
| 2008/0167040 A1 | 7/2008 | Khandekar et al. | |
| 2008/0170602 A1 | 7/2008 | Guey | |
| 2008/0170608 A1 | 7/2008 | Guey | |
| 2008/0212520 A1 | 9/2008 | Chen et al. | |
| 2008/0232395 A1 | 9/2008 | Buckley et al. | |
| 2008/0267310 A1 | 10/2008 | Khan et al. | |
| 2008/0274753 A1 | 11/2008 | Attar et al. | |
| 2008/0307427 A1 | 12/2008 | Pi et al. | |
| 2009/0041151 A1 | 2/2009 | Khan et al. | |
| 2009/0061887 A1 | 3/2009 | Hart et al. | |
| 2009/0122758 A1 | 5/2009 | Smith et al. | |
| 2009/0122884 A1 | 5/2009 | Vook et al. | |
| 2009/0228598 A1 | 9/2009 | Stamoulis et al. | |
| 2009/0238131 A1 | 9/2009 | Montojo et al. | |
| 2009/0252077 A1 | 10/2009 | Khandekar et al. | |
| 2009/0262699 A1 | 10/2009 | Wengerter et al. | |
| 2009/0268675 A1 | 10/2009 | Choi | |
| 2009/0285321 A1 | 11/2009 | Schulz et al. | |
| 2010/0023898 A1 | 1/2010 | Nomura et al. | |
| 2010/0046460 A1 | 2/2010 | Kwak et al. | |
| 2010/0046494 A1 | 2/2010 | Palanki et al. | |
| 2010/0056166 A1 | 3/2010 | Tenny | |
| 2010/0165882 A1 | 7/2010 | Palanki et al. | |
| 2010/0167743 A1 | 7/2010 | Palanki et al. | |
| 2010/0172310 A1 | 7/2010 | Cheng et al. | |
| 2010/0172311 A1 | 7/2010 | Agrawal et al. | |
| 2010/0182903 A1 | 7/2010 | Palanki et al. | |
| 2010/0195566 A1* | 8/2010 | Krishnamurthy et al. | 370/328 |
| 2010/0260154 A1 | 10/2010 | Frank et al. | |
| 2010/0311437 A1 | 12/2010 | Palanki et al. | |
| 2010/0317343 A1 | 12/2010 | Krishnamurthy et al. | |
| 2010/0323718 A1 | 12/2010 | Jen | |
| 2011/0039583 A1 | 2/2011 | Frank et al. | |
| 2011/0081917 A1 | 4/2011 | Frank et al. | |
| 2011/0148700 A1* | 6/2011 | Lasagabaster et al. | 342/357.64 |
| 2011/0149868 A1 | 6/2011 | Krishnamurthy et al. | |
| 2011/0149903 A1 | 6/2011 | Krishnamurthy et al. | |
| 2011/0176440 A1 | 7/2011 | Frank et al. | |
| 2011/0190016 A1* | 8/2011 | Hamabe et al. | 455/507 |
| 2011/0205914 A1 | 8/2011 | Krishnamurthy et al. | |
| 2011/0268101 A1 | 11/2011 | Wang et al. | |

FOREIGN PATENT DOCUMENTS

| | | |
|---|---|---|
| WO | 2008033117 A1 | 3/2008 |
| WO | 2008137354 A1 | 11/2008 |
| WO | 2008137607 A2 | 11/2008 |
| WO | 2010080845 A2 | 7/2010 |

OTHER PUBLICATIONS

3GPP TSG-RAN WG1 #56bis; Seoul, South Korea, Mar. 23-27, 2009; Further Detail on DL OTDOA; R1-091312.

3GPP TSG RAN WG1 #56, "Best Companion" Reporting for Improved Single-Cell MU-MIMO Pairing, Feb. 9-13, 2009, Alcatel-Lucent, R1-0909276, 5 Pages.

3GPP TSG RAN WG1 #57bis: Los Angeles, USA Jun. 29-Jul. 3, 2009, "Feedback Considerations for DL MIMO and CoMP", Qualcomm Europe; R1-092695, 6 pages.

3GPP TSG RAN WG1 #58, Shenzhen, China, Aug. 24-28, 2009, "Implicit Feedback in Support of Downlink MU-MIMO" Texas Instruments, R1-093176, 4 pages.

3GPP TSG RAN WG1 #58, Shenzhen, China, Aug. 24-28, 2009, "Comparison of PMI-based and SCF-based MU-MIMO", Motorola, R1-093421, 2 pages.

3GPP TSG RAN WG1 #60, San Francisco, USA, Feb. 22-26, 2010 "Companion Subset based MBI/CQ1 Feedback for LTE-A MU-MIMO", RIM, R1-101104, 8 pages.

3GPP TSG RAN WG1#61bis, Beijing, China, Apr. 12-16, 2010, "Further Refinements of Feedback Framework" Ericsson, ST-Ericsson, R1-101742. 8 pages.

3GPP TSG RAN WG1 #61bis, Dresden, Germany, Jun. 28-Jul. 2, 2010, "Performance Evaluation of Adaptive Codebook as Enhancement of 4 Tx Feedback", Huawei, R1-103447, 4 pages.

3GPP TSG RAN WG1 #61bis, Dresden, Germany, Jun. 28-Jul. 2, 2010, "A Feedback Framework Based on W2W1 for Release 10", Samsung, R1-103664, 19 pages.

3GPP TSG RAN WG1 #61bis, Dresden, Germany Jun. 28-Jul 2, 2010, "Rationale for Mandating Simulation of 4Tx Widely-Spaced Cross-Polarized Antenna Configuration for LTE-1 MU-MIMO" AT&T, R1-104184, 6 pages.

3GPP TSG RAN WG1 #59bis, Jan. 18-22, 2009, Jeju, Valencia, Spain, Change Request "Clarification of CP Length of Empty OFDM Symbols in PRS Subframes" Ericsson, ST-Ericsson, Motorola, Qualcomm Inc., R1-100311, 23 pages.

3GPP TSG RAN WG1 #56, Athens, Greece, Feb. 9-13, 2009, "On OTDOA Method for LTE Positioning" Ericsson, R1-090918, 6 pages.

Patent Cooperation Treaty, "PCT Search Report and Written Opinion of the International Searching Authority" for International Application No PCT/US2010/041451 Oct. 25, 2010, 16 pages.

3GPP TS 36.355 V9.0.0, Technical Specification Group Radio Access Network, E-UTRA, "LTE Positioning Protocol (LLP) (Release 9)" Dec. 2009, 102 pages.

3GPP TS 36 213 V9.0.0, Technical Specification Group Radio Access Network, E-UTRA, "Physical layer procedures (Release 9)" Dec. 2009; 79 pages.

USPTO Notice of Allowance for U.S. Appl. No. 12/365,166 Apr. 16,2010, 11 pages.

USPTO Notice of Allowance for Application No. 12/365,166 Aug. 25, 2010, 9 pages.

3GPP TS 36.211 V9.0.0, Technical Specification Group Radio Access Network, E-UTRA, "Physical Channels and Modulation (Release 9)" Dec. 2009, 85 pages.

3GPP TS 04.35 V8.3.0 "3rd Generation Partnership Project; Technical Specification Group GSM EDGE Radio Access Network; Location Services (LCS); Broadcast Network Assistance for Enhanced Observed Time Difference (E-OTD) and Global Positioning System (gps) Positioning Methods (Release 1999)" Jan. 1, 2001, pp. 1-35.

3GPP TSG RAN WG4 #53, Nov. 9-13, 2009, Jeju, South Korea, "System simulation results for OTDOA" Ericsson; R4-094532; 3 pages.

3GPP TSG RAN WG1 #59, Nov. 9-13, 2009, Jeju, South Korea, "Introduction of LTE Positioning"Ericsson et al.: R-1094429, 5 pages.

3GPP TSG-RAN WG1 #57 "Discussions of UE positioning issues" NOTREL San Francisco, USA; May 4-8, 2009, R1-091911.

3GPP TSG RAN2 #70, May 10-14, 2010, Montreal, Canada "Signalling support for PRS muting in OTDOA" Ericcson, ST-Ericsson; R2-103102, 2 pages.

3GPP TSG RAN3 #68, May 10-14, 2010, Montreal, Canada "Addition of PRS Muting Configuration Information to LPPa" Ericsson, R3-1015226, 7 pages.

3GPP TSG RAN1 #57, Jun. 29- Jul. 3, 2009; Los Angeles, CA, USA; "On Serving Cell Muting for OTDOA Measurements" Motorola, R1-092628, 7 pages.

3GPP TSG RAN WG1 #55bis; Ljubljana, Slovenia; Jan. 12-16, 2009, Improving the hearability of LTE Positioning Service Alcatel-Lucent, R1-090053, 5 pages.

Patent Cooperation Treaty, "PCT Invitation to Pay Additional Fees and, Where Applicable, Protest Fee" for International Application No. PCT/US2010/038257 Nov. 30, 2010, 9 pages.

3GPP TSG RAN WG4 (Radio) #20, New Jersey, USA; Nov. 12-16, 2001, UTRAN SFN-SFN observed time difference measurement & 3GPP TS 25.311 IE 10.3.7.106 "UE positioning OTDOA neighbour cell info' assistance data fields", Tdoc R4-011408, 4 pages.

USPTO Patent Application Titled "Method and Apparatus for Transmitting Positioning Reference Signals in a Wireless Communication Network" U.S. Appl. No. 12/870,148, filed Aug. 27, 2010.

3GPP TS 36 211 V8.6.0, Technical Specification Group Radio Access Network; E-UTRA; Physical Channels and Modulation. (Release 8) Mar. 2009; 83 pages.

3GPP TS 36.305 V2.0 "3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9)" 3RD Generation Partnership Project (3GPP), Mobile Competence Centre; 650, Route Des Lucioles , F-06921 SOPH1A-Antipolis Cedex; France, May. 21, 2009, pp. 1-60.

3GPP TSG RAN WG1 #58, Aug. 24-28, 2009, Shenzhen, China, "Draft CR 36.211 Introduction of LTE Positioning", R1-093603, 5 pages.

3GPP TSG RAN WG1 #59, Nov. 9-13, 2009, Jeju, South Korea; Change Request 36.211 "Introduction of LTE positioning" Ericsson, R1-095027; 6 pages.

3GPP TSG RAN WG1 #58, Aug. 24-28, 2009, Shenzhen, China, "Draft CR 36.213 Introduction of LTE Positioning", R1-093604; 3 pages.

3GPP TSG RAN WG1 #58, Aug. 24-28, 2009, Shenzhen, China, "Draft CR 36.214 Introduction of LTE Positioning", R1-093605; 6 pages.

3GPP TSG RAN WG1 #59, Nov. 9-13, 2009, Jeju, South Korea, "Text proposal on Orthonogonal PRS transmissions mixed CP deployments using MBSFN subframes" Motorola, R1-095003, 4 pages.

3GPP TSG RAN WG1 #59, Nov. 9-13, 2009, Jeju, South Korea, Change Request 36.214 "Introduction of LTE positioning" Ericsson, et al., R1-094430: 4 pages.

3GPP TSG RAN WG1 #58bis, Oct. 12-16, 2009, Miyazaki, Japan, Change Request 36.213 "Clarification of PDSCH and PRS in combination for LTE positioning" Ericsson, et al , R1-094262; 4 pages.

3GPP TSG-RAN WG2 #66bis "Evaluation of protocol architecture alternatives for positioning" Qualcomm Europe et al, Los Angeles, USA, Jun. 29-Jul. 3, 2009, R2-093855.

3GPP TS 36.211 v8.4.0 Technical Specification Group Radio Access Network, E-UTRA, Physical Channels and Modulation (Release 8); Sep. 2008; 78 pages.

3GPP TSG RAN WG1#55bis, Ljubljana, Slovenia, Jan. 12-19, 2009, "On OTDOA in LTE" Qualcomm, R1-090353, 8 pages.

3GPP TS 25.305 V8.1.0 "3rd Generation Partnership Project; 1-22 Technical Specification Group Radio Access Network; Stage 2 functional specification of user Equipment (UE) positioning in UTRAN (Release 8)" Dec. 1, 2008, pp. 1-79.

3GPP TSG RAN #42, Athens, Greece, Dec. 2-5, 2008, "Positioning Support for LTE" Article 39, 3GPP TR 21.900; RP-080995, 6 pages.

John P. Costas, "A Study of a Class of Detection Waveforms Having Nearly IdealRange-Doppler Ambiguity Properties," Proc. IEEE, vol. 72, No. 3, Aug. 1984, pp. 996-1009.

Jiann-Ching Guey, "Synchronization Signal Design for OFDM Based on Time-Frequency Hopping Patterns", Proceedings of IEEE International Conference on Communications, 2007, pp. 4329-4334.

3GPP TSG RAN WG1 #56bis, Mar. 23-27, 2009, Seoul, South Korea; "Reference Signals for Low Interference Subframes in Downlink" Ericsson, R1-091314; 8 pages.

3GPP TSG RAN1 #58 Aug. 24-28, 2009, Shenzhen, P.R. China, "Positioning Subframe Muting for OTDOA Measurements" Motorola, R1-093406; 9 pages.

3GPP TSG RAN1 #58 Aug. 24-28, 2009, "LS on assistance information for OTDOA positioning support for LTE" R1-093729, 3 pages.

Patent Cooperation Treaty, "PCT Search Report and Written Opinion of the International Searching Authority" for International Application No, PCT/US2010/030516 Oct. 8, 2010, 24 pages.

3GPP TSG RAN WG1 #56, Athens, Greece: Feb. 9-13, 2009 "On OTODA method for LTE Positioning" Ericsson, R1-090918, 6 pages.

Patent Cooperation Treaty, "PCT Search Report and Written Opinion of the International Searching Authority" for International Application No. PCT/US2010/036982 Nov. 22, 2010, 17 pages.

Patent Cooperation Treaty, "Search Report and Written Opinion" for International Application No. PCT/US2011/025607 Aug. 19, 2011, 21 pages.

3GPP TSG-RAN WG1 #57, R1-091912 "Simulation results on UE positioning using positioning reference signals" Nortel; San Francisco, USA', May 4-8, 2009, 11 pages.

United States Patent and Trademark Office "Notice of Allowance and Fee(s) Due"for U.S. Appl. No. 13/040,090 dated Mar. 8, 2012, 6 pages.

Patent Cooperation Treaty, "PCT Search Report and Written Opinion of the International Searching Authority" for International Application No. PCT/US2011/044103 Oct. 24, 2011, 15 pages.

3GGP TSG RAN WG1 #59bis, Jan. 8-22, 2009, Jeju, Valencia, Spain, Change Request "Clarification of the CP length of empty OFDM symbols in PRS subframes"Ericsson, ST-Ericsson, Motorola, Qualcomm Inc, R1-100311; 2 pages.

United States Patent and Trademark Office, "Non-Final Rejection" for U.S. Appl. No. 12/542,374 dated Dec. 23, 2011, 23 pages.

United States Patent and Trademark Office, "Non-Final Rejection" for U.S. Appl. No. 12/573,456 dated Nov. 18, 2011, 10 pages.

United States and Trademark Office, "Final Rejection" U.S. Appl. No. 12/573,456 dated Mar. 21, 2012, 14 pages.

3GPP TSG-RAN WG1 #57, May 4-8, 2009, "Simulation Results on UE Positioning Using Positioning Reference Singals", Nortel, R1-091912, 11 pages.

Patent Cooperation Treaty "PCT Invitation to Pay Additional Fees and, Where Applicable, Protest Fee" for International Application No. PCT/US2011/025607, Jun. 9, 2011, 13 pages.

3GPP TR 36.814 V9.0.0, "Technical Specification Group Radio Access Network, Evolved Universal Terrestrial Radio Access (E-UTRA), Further Advancements for E-UTRA Physical Layer Aspects" (Release 9) Mar. 2010, 104 pages.

* cited by examiner

WIRELESS TERMINAL AND METHOD FOR MANAGING THE RECEIPT OF POSITION REFERENCE SINGALS FOR USE IN DETERMINING A LOCATION

FIELD OF THE INVENTION

The present invention relates generally to the determination of a location of a mobile subscriber in a cellular wireless communication network. More particularly, the present invention relates to the management of the receipt of position reference signals, as well as the receipt of assistance data for use in determining a time of arrival of a respective signal from each of multiple base stations.

BACKGROUND OF THE INVENTION

Location determination is becoming an increasingly important capability for some electronic devices, such as cellular telephones, personal digital assistants (PDA's), and portable computers, as well as other devices. Separate from the direct benefits associated with knowing one's current location, many venders are introducing or contemplating location based services or solicitations, which can be selectively made available to the user of an electronic device, and which are dependent upon the device's current and/or anticipated location. Still other location based features and/or capabilities, relative to portable electronic devices, are being mandated by governmental agencies. One such example of a location based feature, which has been mandated by the US Federal Communication Commission (FCC), includes a feature known as E911.

In conjunction with supporting the various location based features and services, many different technologies and techniques have been developed, which are intended to support making a location determination. Each technology and/or technique has a varying degree of accuracy, time, supporting infrastructure requirements, and rates of success. For example, various technologies generally make use of terrestrial based reference locations, such as one or more base stations; non-terrestrial based reference locations, such as one or more orbiting satellites; or a combination of the two. Many techniques make use of a measure of a position relationship relative to multiple reference locations, whether it is distance, direction, or both, which can be directly or indirectly identified or inferred. In many instances the position relationship can be derived from an analysis of a received reference signal originating from multiple reference locations. Examples of various techniques and/or determination approaches include the use of global positioning systems that can typically make use of a constellation of space-based satellites. Several such techniques can include a mobile station-assisted assisted global positioning system, a mobile station-based assisted global positioning system, and/or an autonomous global positioning system, where the space-based satellites represent reference locations from which a mobile subscriber's location can be derived using various triangulation/trilateration approaches. Additional examples include positioning systems that alternatively use the same or similar triangulation/trilateration approaches, but rely upon ground based reference locations, which can take the form of beacons, cell towers, base stations, or other signal sources, each having a known or an inferable position.

While the use of space based reference locations as part of a global positioning system is becoming increasingly popular, there are some instances when systems that primarily or exclusively use space based reference locations can be frustrated or impractical. Generally in order to make use of a reference location, whether it is space-based or land-based, the mobile station needs to be able to receive a reference signal therefrom. In some instances, signals from a particular reference location may be unavailable due to interference from other signal sources or due to various absorption/reflection of a reference signal. For example, reference signals from space based locations can sometimes be unavailable within certain structures as the types of signals used by the signal sources will have a varying ability to penetrate into a building or other obstructing structures.

Consequently even with the more widespread support for and availability of space based global positioning systems, there is still a need for terrestrial based systems, that can supplement or be used in place of the space based systems in at least some circumstances in order to give greater assurances of meeting location determining requirements, such as the requirements under the E911 regulations.

As such, alternative reference signals from other suitable signal sources having a known location may need to be available in order to enable an alternative manner or approach of determining a location of the mobile station. One such signal source can include cellular base stations. However, in order to provide enough information with which a location can be determined, a signal from which relative positioning information, such as range or direction, from multiple sources having a known location is needed. With cellular base stations, signals from nearby base stations can interfere with other more remotely located base stations, thereby making it more difficult to receive a signal from one of the more remotely located signal sources, as well as making it more difficult to derive the needed signal characteristics from the received signal for use in determining a location.

In some instances a particular signal source may be unsuitable, for which any attempts to receive a signal from the particular source might result in failure, unnecessary delay, and/or wasted resources. In other instances a signal source suitable for deriving a signal for use in determining a location may not be readily known to the mobile subscriber as part of any other readily maintained list of reference signal source sites, but which may be most suitable for supporting a location determination.

Consequently, a method which sends lists of base stations that could be used to identify or supplement other known lists of suitable and/or unsuitable signal sources for use in receiving a reference signal for use in making a location determination would be beneficial.

SUMMARY OF THE INVENTION

The present invention provides for a method in a wireless terminal for use in a location determination approach using time of arrival estimates between the wireless terminal and a plurality of base stations in a cellular network. The method includes receiving assistance data from a serving base station for use in receiving a position reference signal used to determine a time of arrival of respective position reference signals from the plurality of base stations relative to a time reference, wherein the assistance data includes a list of base stations, each base station included in the list to be one of used or excluded from use as part of the plurality of base stations for receiving the position reference signal and determining the time of arrival estimate for the received position reference signal. The position reference signal is then received for each of the plurality of base stations, where for each of the plurality of base stations a time of arrival estimate is determined for each of the respective received position reference signals. The time of arrival estimates for each of the plurality of base stations is then forwarded to a location determination entity.

In at least one embodiment, the assistance information includes a white list of base stations, which includes base stations to be used for receiving a position reference signal and determining a time of arrival estimate for the received position reference signal.

In at least a further embodiment, the assistance information includes a black list of base stations, which includes base stations to be excluded from use for receiving a position reference signal and determining a time of arrival estimate for the received position reference signal.

In a still further embodiment, the list of base stations included as part of the assistance information includes a list of communication cell identifiers, which includes identifiers for communication cells to be one of used or excluded from use for receiving a position reference signal and determining a time of arrival estimate for the received position reference signal.

The present invention further provides a wireless terminal for use in a cellular wireless communication network having multiple base stations including a serving base station. The wireless terminal includes a transceiver including a transmitter and a receiver, a timer for maintaining a local time reference; and a controller coupled to the transceiver and the timer. The controller includes a location determination module adapted for managing the receipt of assistance data from the serving base station for determining a timing relationship between the time reference for each of a plurality of base stations and the local time reference, wherein the assistance data includes a list of base stations, each base station included in the list to be one of used or excluded from use as part of the plurality of base stations for receiving a position reference signal and determining a time of arrival estimate for the received position reference signal. The location determination module is further adapted for managing the receipt of a plurality of respective position reference signals, via the transceiver, the position reference signals each having a time of receipt within the wireless terminal The location determination module is further adapted for calculating a time of arrival estimate for each of the received position reference signals from the determined timing relationship and received position reference signal for each of the plurality of base stations, as well as adapted for managing the transmission of the time of arrival estimate for each of the plurality of base stations to a location determination entity.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
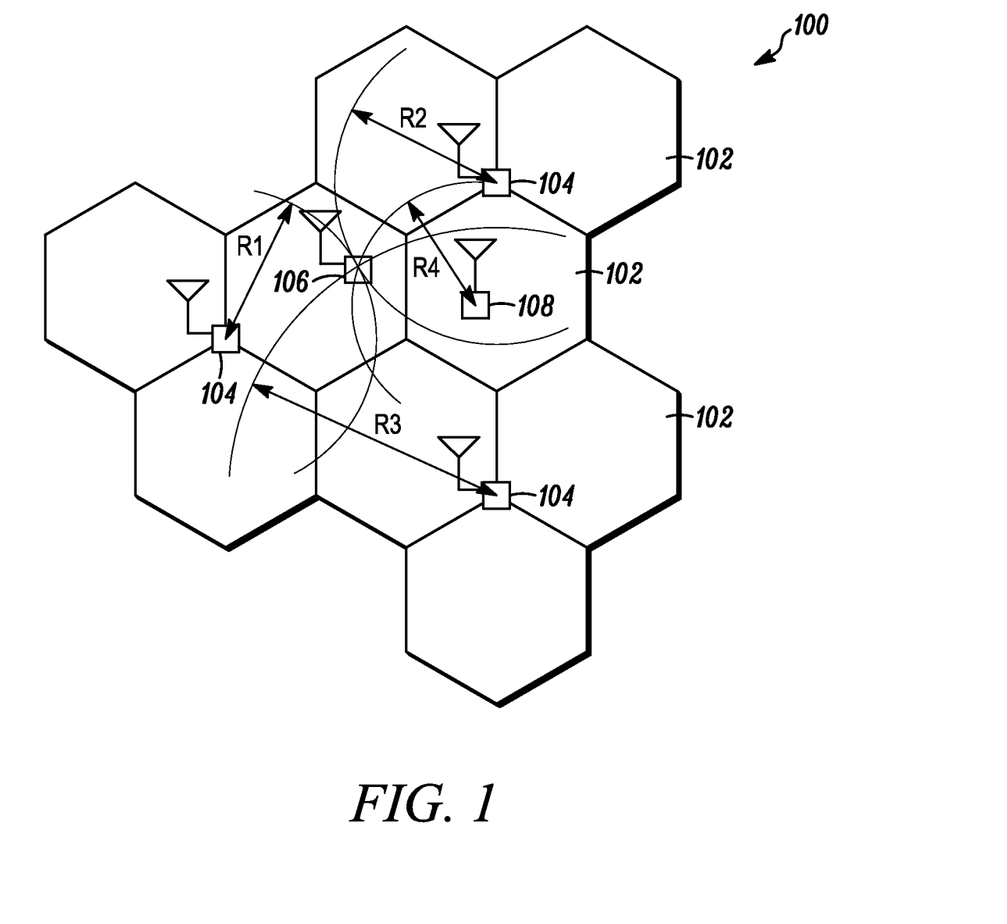
FIG. 1 is an exemplary topographical view of at least a portion of an exemplary wireless communication system illustrating an environment within which at least one embodiment of the present invention can operate.

FIG. 1 illustrates an exemplary topographical view of at least a portion of a wireless communication system. The topographical view 100 includes a plurality of cells 102 pictorially represented as hexagons. The hexagons are only rough approximations of the footprint or intended area of coverage associated with each of a plurality of cellular regions, where in reality the area of transmission or potential coverage is not so uniformly defined. Each cell is typically served by a base station 104, referred to as a serving station, that communicates with wireless terminal 106, such as a mobile wireless communication device, located and/or traveling within the corresponding cell 102.

In some instances a base station will be uniquely associated with a particular cell. In such an instance, the base station might be located proximate the center of the cellular transmission region. However more recently, cellular standards have been developed that make use of directional antennas that define a cellular area relative to a transmission that is associated with a particular direction. Because a signal can be directed in one or more of multiple potentially different directions relative to a particular source of transmission, a single base station location might support multiple directional signals each propagating in a different direction, so as to provide potentially distinct communication signaling in multiple respective cellular communication areas, where instead of being centrally located relative to a particular cell and transmitting omni-directionally, the base station is located at the shared vertex of several adjacent cellular areas, and directs one of a plurality of different sets of communication signals to a respective one of the cellular areas. Such an arrangement allows a single base station to support multiple communication cells. One such type of cellular communication standard, which supports such an arrangement is the Long Term Evolution (LTE) cellular communication standard being developed as part of the 3rd Generation Partnership Project.

While a particular wireless terminal 106 will be present in a particular cellular region being served by a particular base station 104, the wireless terminal 106 will often monitor the transmissions of other nearby base stations and/or monitor the multiple different sets of communication signals being transmitted by the same or other nearby base stations, in order to determine whether the communication signaling being used to support communications with a particular wireless terminal should be changed to a different set of communication signaling being used to support communications in another cellular region. This can often be the case with a mobile wireless terminal that is meaningfully changing its location over time. In some instances, this may require that the wireless terminal 106 begin communicating with a different base station 104. In other instances, this may require that the wireless terminal 106 begin communicating with the same base station via a different set of communication signals corresponding with a different direction relative to the base station 104. Such a change between different sets of communication signaling being used to support communications in another cellular region is often referred to as a handover.

In order to support the handover of an ongoing communication between one cellular region to another cellular region, and the corresponding monitoring of communication signals associated with other nearby cellular regions, a wireless terminal will often receive a neighbor list including the details necessary for monitoring the signals associated with other nearby cellular regions. Traditionally, this has been handled through the monitoring of a cell specific reference signal, such as a pilot signal. These cell specific reference signals are regularly transmitted with the transmissions associated with a particular cellular area, and occur with predefined regularity that tends to be the same for other nearby cellular areas. In fact, pilot signals in many systems are employed in a manner often referred to as full re-use, which tends to limit the hearability of signals for any particular wireless terminal to the pilot signals associated with no more than a couple of cells. But for purposes of handoff, hearability that is limited to pilot signals associated with a couple of cells is generally sufficient, because you generally will be connected to or will want to transition to the particular cell with which you have the greatest hearability.

However while hearability of pilot signals relative to a couple of cells are sufficient for meeting the requirements of making a handover determination, for purposes of determining a location, a location determination approach can often require a different set of reference signaling, and coordination between nearby sources of interference (i.e. other nearby cells) to insure a sufficient number of signals can be received and suitably analyzed to enable a location to be determined Generally a range is determined relative to a particular one of a plurality of signal sources having a known or inferable location, based upon a measured time of arrival of the reference signal. The time of arrival is used to estimate the propagation delay and a corresponding distance traveled. From the range information relative to multiple known locations, a position of the wireless terminal can be trilaterated. Trilateration can be visualized by seeing the point of intersection of a plurality of arcs corresponding to the determined range relative to a plurality of known locations. While trilateration can be applied with measurements from three signal sources, the accuracy of the position estimate of the wireless terminal can be improved by combining sets of measurements from additional signal sources. A least squares estimation approach can be used to combine multiple sets of measurements including instances involving more than three sets of measurements from more than three respective signal sources, and in turn help to provide a determined location that generally has greater accuracy.

Because in many instances, the time reference for the base station and the wireless terminal are not the same, a further approach which can readily accommodate instances where a common time reference is not assumed for use in determining the location of a wireless terminal are methods involving an observed time difference of arrival (OTDOA). In such a method, the time of arrival of a reference signal is measured relative to the time of arrival of a signal from a serving cell. Typically, location estimation in WCDMA/LTE based on OTDOA uses the time difference measurements of neighbor cells with respect to the serving cell. The locus traced by t1-t2 equals a constant, where t1 and t2 are the time of arrival (TOA) of a first path of a signal from respective ones of the two basestations is a hyperbola and not a circle.

In FIG. 1, the wireless terminal 106 is illustrated at the intersection of several arcs, in the form of circles each having a respective radius R1, R2 and R3 corresponding to the determined distance relative to each of a plurality of base stations 104. A location corresponding to the intersection point and the location of the wireless terminal 106 can then be determined. Such a determination is often performed by a location determination entity, that maintains a list of signal sources and their known locations, and receives the measured range information. While the wireless terminal could typically perform this calculation, it is often easier to maintain the relevant location information in a server, such as a gateway or serving mobile location center, which can also perform the necessary calculations, after receiving the detected timing information relative to the signal sources. For example, the timing information can include time of arrival relative to a local or a global time reference and/or a time difference of arrival measurement.

FIG. 1 further identifies the possibility of a further signal source 108, which may or may not be a base station, associated with any of the illustrated cellular areas. For example, the signal source 108 could correspond to any kind of transmitter whose location is known or can be readily determined, and from which a time of arrival estimate for a transmitted signal, and correspondingly an estimated distance R4 relative to the wireless terminal 106, can be determined In some instances the signal source 108 could correspond to a closed base station, which is not available to provide service to the wireless terminal, but which has a known location and from which the transmission of a reference signal can be detected. In such an instance the availability of the signal source for use in identifying a time of arrival of a reference signal can be determined through a white list of signal sources communicated to the wireless terminal. In accordance with at least one aspect of the present invention, a white list generally includes a list of signal sources having known locations, which transmit detectable signals having known timing information, that could be used to trilateralate a location, and might or might not be otherwise known to the wireless terminal.

Alternatively, a wireless terminal might receive a black list, which could include known signal sources which should be expressly avoided for purposes of determining a time of arrival estimate of a transmitted signal. It is possible that some base stations or signal sources might not support the transmission of a position signal. It is further and/or alternatively possible that some base stations or signal sources do not have a known location. Further yet, it is possible that the relative timing information needed to more accurately determine and/or to conveniently determine a time of arrival of a signal from a particular signal source may be lost or unknown.

In at least some instances, the black list and/or the white list can take of the form of assistance data received from the serving base station or other authorized source that is communicated to the wireless terminal via a system information broadcast signal. Alternatively the black list and/or the white list can be communicated to one or more wireless terminals via a radio resource control message.

Figure 2:
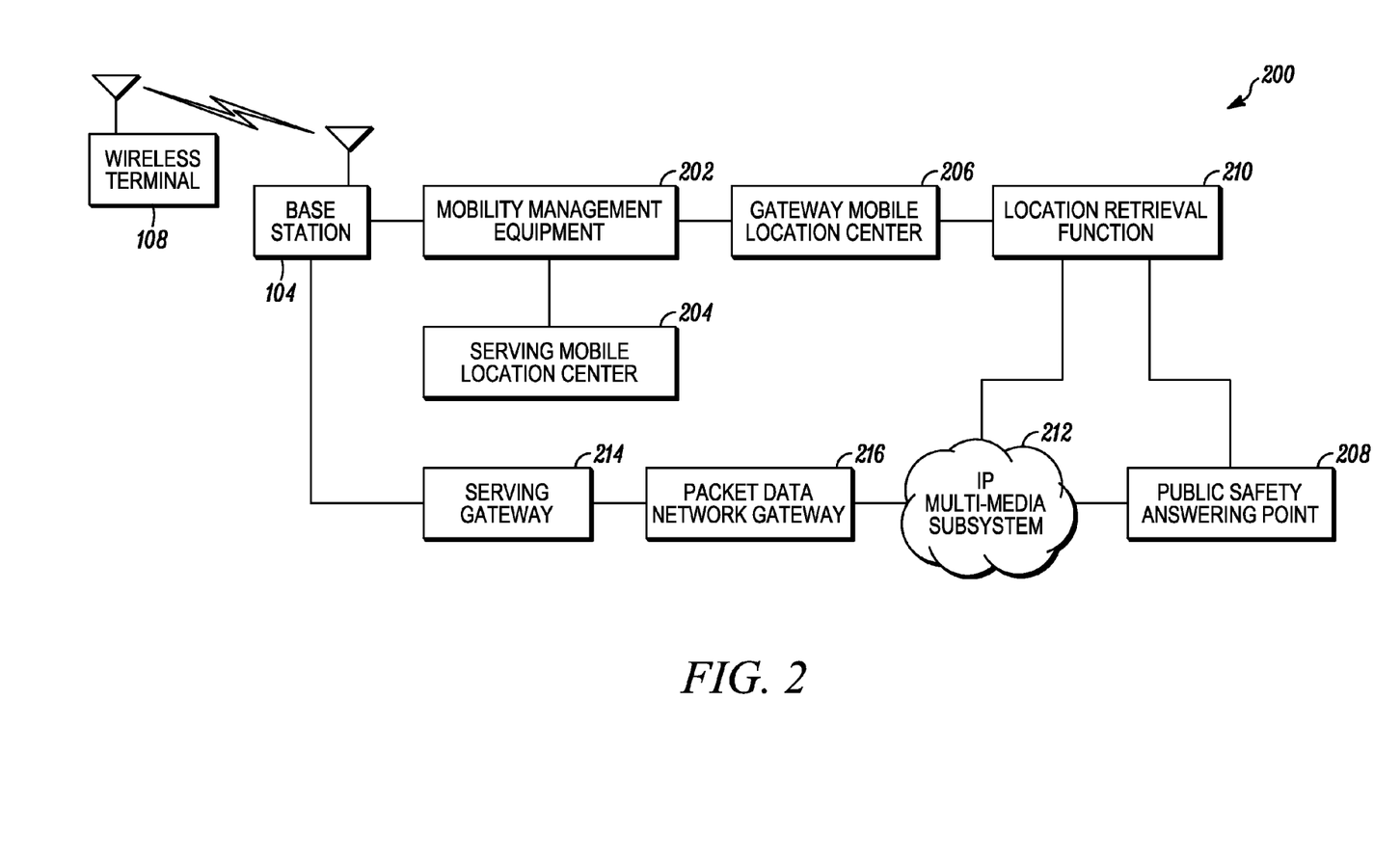
FIG. 2 is a block diagram of an exemplary system architecture illustrating an environment within which at least one embodiment of the present invention can operate.

FIG. 2 illustrates a block diagram 200 of an exemplary system architecture illustrating an environment within which at least one embodiment of the present invention can operate. More specifically the exemplary system architecture includes several elements intended to support location related services, relative to a Long Term Evolution (LTE) type cellular network, either directly or indirectly. Generally, the wireless terminal 106 communicates with the network, and more specifically a base station 104, via a wireless communication connection. The base station 104 manages the wireless interface of the network infrastructure through which wireless terminal communicates.

The base station, which is sometimes referred to as an enhanced node B, is coupled to mobility management equipment 202. The mobility management equipment 202 generally operates as a control node for the access network. It is often responsible for the idle mode tracking of wireless terminals, and the paging procedure including retransmission. The mobility management equipment further is responsible for the authentication of the user, the allocation of temporary identities to the wireless terminal, the authorization of the wireless terminal to camp on the network, as well as the enforcement of roaming restrictions. The mobility management equipment further chooses the serving gateway at the time of the initial attach and at the time of a handover within the network. The mobility management equipment will further provide the control plane function for mobility between the network and at least some other types of networks.

Further coupled to the mobility management equipment 202 are the serving mobile location center 204 and the gateway mobile location center 206. The serving mobile location center 204 manages local location determination, and effectively is the engine for performing the location calculation for the wireless terminal 106 with the benefit of the determined time of arrival/range information and the respective locations of the source of the signals detected for purposes of producing the determined range/time of arrival information. The gateway mobile location center 206 working through the mobility management equipment 202 handles the interface to the public safety answering point 208, which is the interface to the call center or emergency provider associated with an emergency 911 system. The public safety answering point 208 manages the location query through a location retrieval function 210, which can be either directly connected to the public safety answering point, or via a packet data network, such as an Internet Protocol Multi-Media Subsystem 212.

The base station 104 is alternatively coupled to the packet data network via a serving gateway 214 and a packet data network gateway 216, which facilitates the communication of packet data containing more than just location information in support of an emergency call. In fact, in LTE the packet data connection plays a more central role in providing network data connections, including data connections which in prior cellular systems were generally supported by a circuit switched connection. The serving gateway 214, in addition to forwarding user data packets, also acts as a mobility anchor relative to a wireless terminal 106 for inter base station 104 handovers. A wireless terminal can have simultaneous connectivity with more than one packet data network gateway 216 for accessing multiple packet data networks 212.

Figure 3:
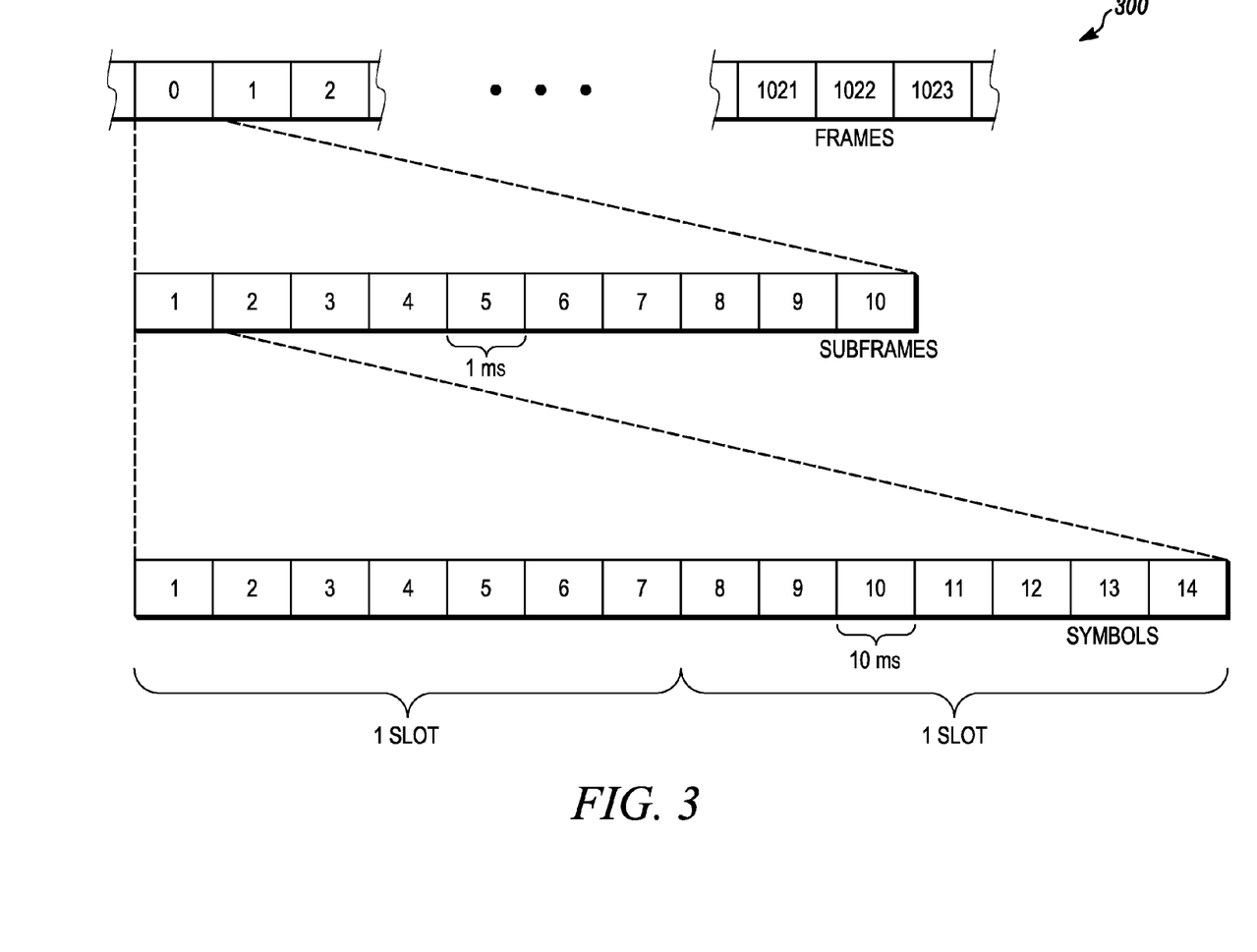
FIG. 3 is a signaling structure for use in organizing and arranging the information, such as sequence of symbols to be transmitted and received as part of an exemplary communication system within which the present invention can operate.

FIG. 3 illustrates a signaling structure 300 for use in organizing and arranging the information, such as sequence of symbols to be transmitted and received as part of an exemplary communication system within which the present invention can operate. More specifically, the illustrated signaling structure 300 is consistent with at least one developing cellular standard, including the above noted LTE type cellular network. Generally, the LTE type cellular network employs a downlink signaling structure which makes use of orthogonal frequency division multiplexing, where a particular channel will have symbols distributed across multiple frequency and time slices. As a function of time, the cellular base stations transmit, in sequence, a plurality of frames numbered 0 to 1023. Each frame is subdivided into 10 subframes of 1 ms each. Each subframe can be further subdivided into 2 slots or 14 symbols, where each symbol corresponds to an approximately 70 μs time slice or time segment.

Figure 4:
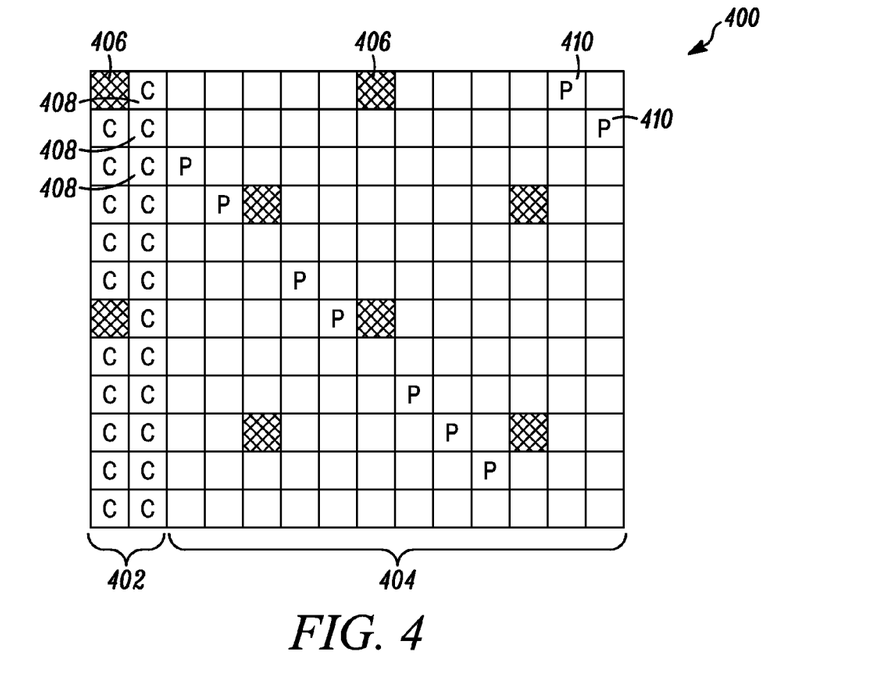
FIG. 4 is a resource block illustrating an arrangement of a plurality of grouped resource elements, which span a plurality of frequencies and time segments associated with a single downlink channel of an exemplary communication system.
Figure 5:
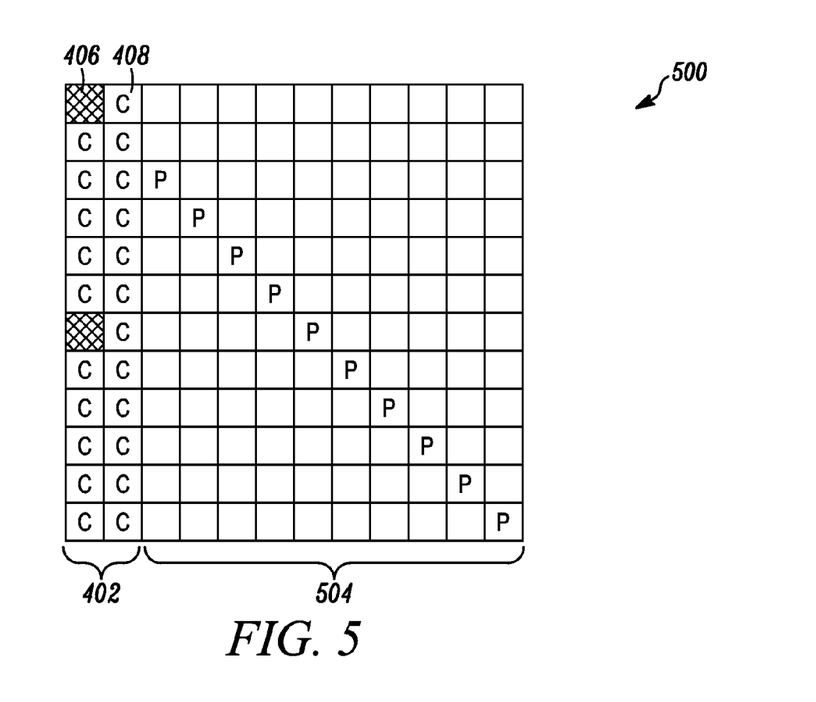
FIG. 5 is a resource block illustrating a further arrangement of a plurality of grouped resource elements, which span a plurality of frequencies and time segments associated with a single downlink channel of an exemplary communication system.

FIGS. 4 and 5 illustrate a pair of exemplary resource blocks, which further highlight an arrangement of a plurality of grouped resource elements, which span a plurality of frequencies and time segments associated with a single downlink channel of an exemplary communication system. In the illustrated embodiments, each vertical time slice represents a symbol, where each symbol includes twelve resource elements distributed across multiple frequencies. Generally, the multiple frequencies represent a set of frequencies, which are each spaced apart on frequency centers having 15 kHz spacing, within an allocated spectrum space. As such each resource block, according to the exemplary embodiment represents a grid of resource elements that span multiple symbols and multiple frequencies, within which data to be communicated including cell specific reference signal, position reference signal, control signals and generic data signals can be encoded. In the illustrated embodiments, the general transmission block includes 14 symbols, and a broadcast type transmission block includes 12 symbols.

FIGS. 4 and 5 illustrate two types of exemplary resource blocks 400 and 500. FIG. 4 corresponds to a general transmission block 400 for supporting a communication between a base station and a particular wireless terminal, and FIG. 5 represents a broadcast type transmission block 500 for supporting a communication from a base station, which is intended for simultaneous receipt by one or more wireless terminals. In each instance the first two symbols 402 are associated with both cell specific reference type signals 406, which in at least some instances corresponds to a pilot signal, and control type signals 408. The first two symbols are generally referred to as control symbols 402. The resource elements associated with the cell specific reference type signals are illustrated using a cross hatching, while the resource elements associated with control type signals are illustrated using the letter 'c'.

In the case of the general transmission block, additional reference elements corresponding to the cell specific reference type signals are additionally interspersed with some of the following 12 non-control symbols 404. These additionally interspersed cell specific reference type signals are not necessarily included in the broadcast type transmission block 500 illustrated in FIG. 5. In the illustrated embodiment, a further set of specifically identified resource elements 410 are illustrated. The further set of specifically identified resource elements are associated with a position reference signal, and are illustrated using the letter 'p'.

The position reference signals differ from at least some other reference signals in so far as they are specifically intended to support a time of arrival estimation or other identifiable signal characteristic, which can be used to support a position location determination. Position reference signals are further intended to be at least somewhat non-interfering relative to other nearby signal sources similarly transmitting a position reference signal or other signal during the same time period. While a somewhat arbitrary pattern of resource elements is shown, other patterns are possible without departing from the teachings of the present invention. In at least some instances, other signal sources could use a similar pattern that may be shifted in frequency or time to produce a pattern with less opportunity to interfere with similar transmissions associated with another nearby signal source, which can then be used by a wireless terminal as part of a determination of the wireless terminal's current location. Generally, by limiting the interference between position reference signals associated with multiple nearby signal sources, signals which would be otherwise difficult to detect in the presence of an interfering signal from a more proximate signal source, such as the serving base station become more readily detectable.

Because the strength of a received signal is generally related to the proximity of the signal source, in instances where multiple signal sources are transmitting at the same time and roughly the same amplitude, the signals that will be most readily detected are the signals from the sources that are more proximate. As such, as a wireless terminal initiates a communication connection or moves between coverage areas while maintaining a communication connection in a cellular communication system, signals from some signal sources may be or may become more easily received while some signals from some signal sources may be or may become less easily received. Generally, the system will want to communicate with the wireless terminal via the base station, having the greatest signal to noise ratio. Normally, the wireless terminal is not necessarily so concerned with being able to detect a signal from other nearby non-serving base station, as the wireless terminals only needs to be able to communicate with the serving base station in order to support a communication connection with the network. However in the case of determining a location through triangulation or trilateralization, receiving a corresponding signal and determining range or angular information therefrom relative to the multiple signal sources is often necessary.

As noted previously, in some instances a wireless terminal may make use of a neighbor list as a starting point for identifying potential signal sources that a particular wireless terminal might use for determining a time of arrival in support of a location determination. In such an instance the available signal sources for purposes of determining a location might be supplemented with one or more additional potential suitable signal sources as part of a white list. Such a list can include signal sources in the form of base stations associated with closed or hybrid base stations, which are unavailable for supporting a communication connection, and therefore would not be included in a neighbor list, but could be available for receiving a reference signal and associating a detectable characteristic associated with the received reference signal and using it with a known location of the signal source in order to support a location determination of the wireless terminal It may be necessary to coordinate information associated with a closed or hybrid base station with the serving network, so the information is available at the server for supporting a location determination based upon the respective characteristics of the received position reference signal.

It is possible that the wireless terminal may not use a neighbor list, but may exclusively rely upon the signal sources in the white list, or it is possible that the white list may supplement a still further available list.

Alternatively and/or additionally, a black list could be used to supplement another list, such as a neighbor list, so as to exclude from use a particular signal source for use in a location determination, that might be appropriate for becoming a handover destination and a serving base station thereof, but which might not be suitable for supporting a location determination, due to some absence or defect in the available information that might be needed, relative to a particular signal source, in order to support a location determination.

Furthermore, the black list can be used to identify and/or eliminate redundancies. For example, as noted in connection with the embodiment illustrated in FIG. 1, it is possible for several signal sources to be co-located. While the possibility of receiving multiple reference signals from the same proximate location may serve to confirm a measurement associated with another received signal, the redundant information is generally not helpful in terms of determining a location, as a certain number of distinct measurements may be necessary to produce a single estimated location. So in at least some instances, the black list could be used to identify at least some of the co-located signal sources for which a measurement might produce redundant data, and in turn the acquisition of which may be wasteful of available resources, such as processing time or battery power.

As deficiencies associated with a particular signal source for purposes of using it to receive a reference signal are overcome, a particular signal source can be added to a white list or removed from a black list. As noted previously, this can occur when a timing relationship between base stations is established or determined, which can be used to support a time of arrival measurement or time difference of arrival measurement. It can also occur when a location is established or identified relative to a particular signal source. Still further, it can occur when other information that helps identify the nature of the positional reference signal including the particular structure or format as well as information as to when the same will be transmitted, including the relationship of the transmission relative to other potential nearby interfering sources, so that the positional reference signal can be received and identified by a wireless terminal.

Figure 6:
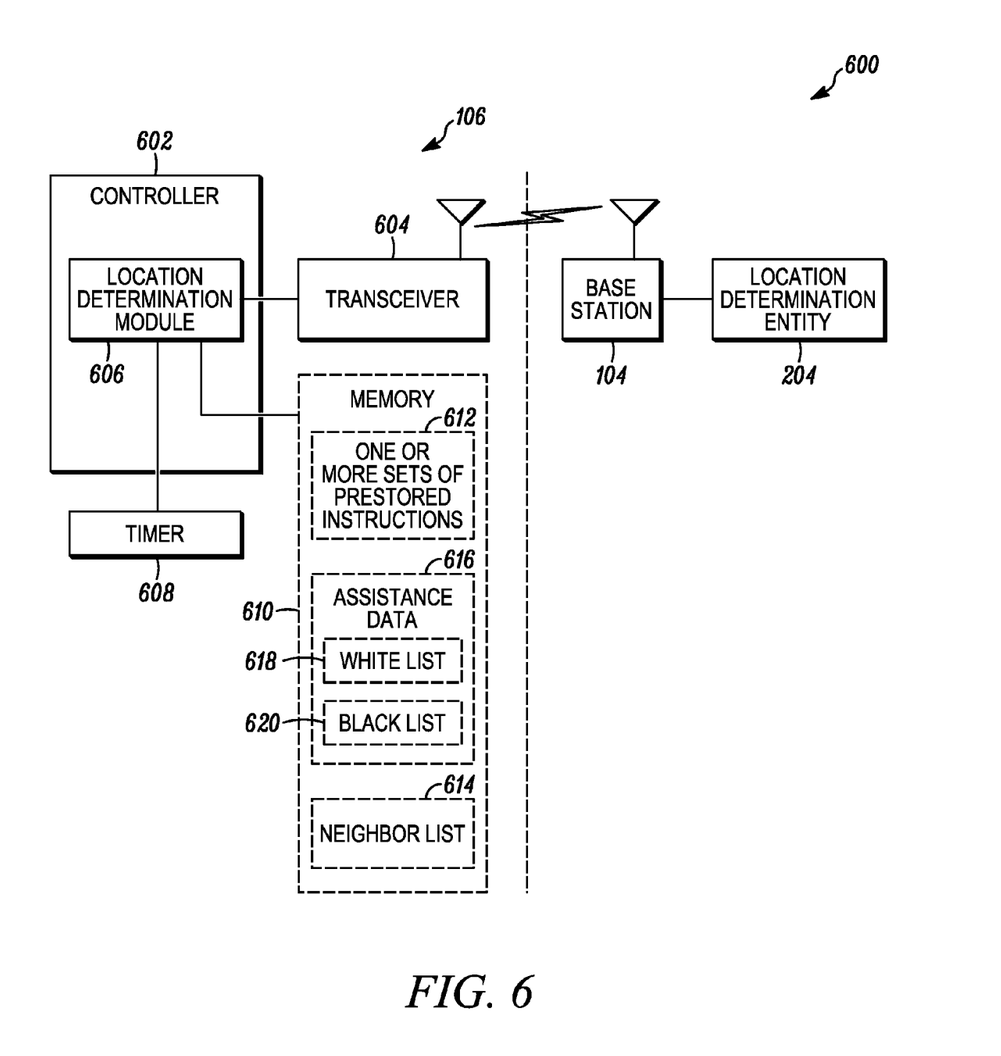
FIG. 6 is a block diagram of a wireless terminal and a portion of the network infrastructure with which the wireless terminal can communicate, in accordance with at least one exemplary embodiment of the present invention.

FIG. 6 illustrates a block diagram 600 of a wireless terminal 106 and a portion of the network infrastructure, such as a base station 104 and/or a location determination entity 204, with which the wireless terminal can communicate, either directly or indirectly, in accordance with at least one exemplary embodiment of the present invention. The wireless terminal includes a controller 602 including a location determination module 606, which is coupled to a transceiver 604 and a timer 608. The transceiver 604, facilitates the transmission and receipt of a wireless signal including the receipt of a position reference signal from one or more signal sources, such as a base station 104. The timer 608, maintains a local time reference for use in determining a time of arrival or a time difference of arrival relative to signal transmitted from a signal source having an associated location, which is known or can be determined.

The location determination module 606 is adapted for managing the receipt of assistance data from the serving base station for determining a timing relationship between the time reference for each of a plurality of base stations and the local time reference, wherein the assistance data 616 includes a list of base stations. Each base station included in the list is to be one of used or excluded from use as part of the plurality of base stations for receiving a position reference signal and determining a time of arrival estimate for the received position reference signal. The location determination module 606 is further adapted for managing the receipt of a plurality of respective position reference signals, via the transceiver 604, the position reference signals each having a time of receipt within the wireless terminal from the respective ones of the plurality of base stations. The location determination module 606 is further adapted for calculating a time of arrival estimate for each of the received position reference signals from the determined timing relationship and received position reference signal for each of the plurality of base stations, as well as adapted for managing the transmission of the time of arrival estimate for each of the plurality of base stations to a location determination entity.

In some instances the location determination module is implemented as part of one or more sets of prestored instructions 612 that are stored in a computer readable form, such as a memory 610. In such an instance, the controller 602 might include a processor for executing the one or more sets of prestored instructions 612. In some instances the memory 610 may be either integrated as part of the controller or may be coupled to the controller 602. The memory 610 can include one or more forms of volatile and/or non-volatile memory, including conventional ROM, EPROM, RAM, or EEPROM. The memory 610 may still further incorporate one or more forms of auxiliary storage, which is either fixed or removable, such as a harddrive or a floppydrive. One skilled in the art will still further appreciate, that still other further forms of memory could be used without departing from the teachings of the present invention. In the same or other instances, the controller 602 may additionally or alternatively incorporate state machines and/or logic circuitry, which can be used to implement at least partially, some of the location determination module and their corresponding functionality.

In some instances the location determination entity 204 is a location determination server, such as a serving mobile location center, which can be coupled to the base station via other network elements, such as the mobility management equipment 202.

In addition to one or more sets of prestored instructions, the memory could further serve to store a neighbor list 614, which might be used to identify other nearby signal sources for both mobility management as well as location determination, as well as assistance data 616 for use in determining a location of the wireless terminal, including a white list 618 and/or a black list 620. It is possible that still further assistance data is possible for purposes of supporting a location determination. In some instances the assistance data might serve to speed up the location determination by providing information, which might otherwise need to be determined or detected in support of the detection of a position reference signal and a determination of a time of arrival. In other instances, some of the information provided as assistance data may be more essential as part of the location determination process, which might otherwise prove to be very difficult in absence of the received assistance data.

Examples of assistance data might include identification information from which the reference signal pattern and location within a transmitted signal stream can be derived or determined.

While in at least some embodiments the wireless terminal can take the form of a radio telephone, and more specifically a cellular telephone, the present improvements are believed to be applicable to many other forms of location determination systems, which might receive signals from multiple signal sources from lists that may be less than complete, or may include signal sources that are not suitable for deriving a position reference signal, as well as many other forms of wireless terminals including laptop and handheld computer units, global positioning system units, as well as any other form of electronic device adapted for receiving a wireless signal, that might benefit from having its location determined, without departing from the teachings of the present invention. Still further, there is no requirement that the signaling be part of an OFDM downlink data channel, but other form of signaling from which a time of arrival can be determined would similarly be suitable.

Figure 7:
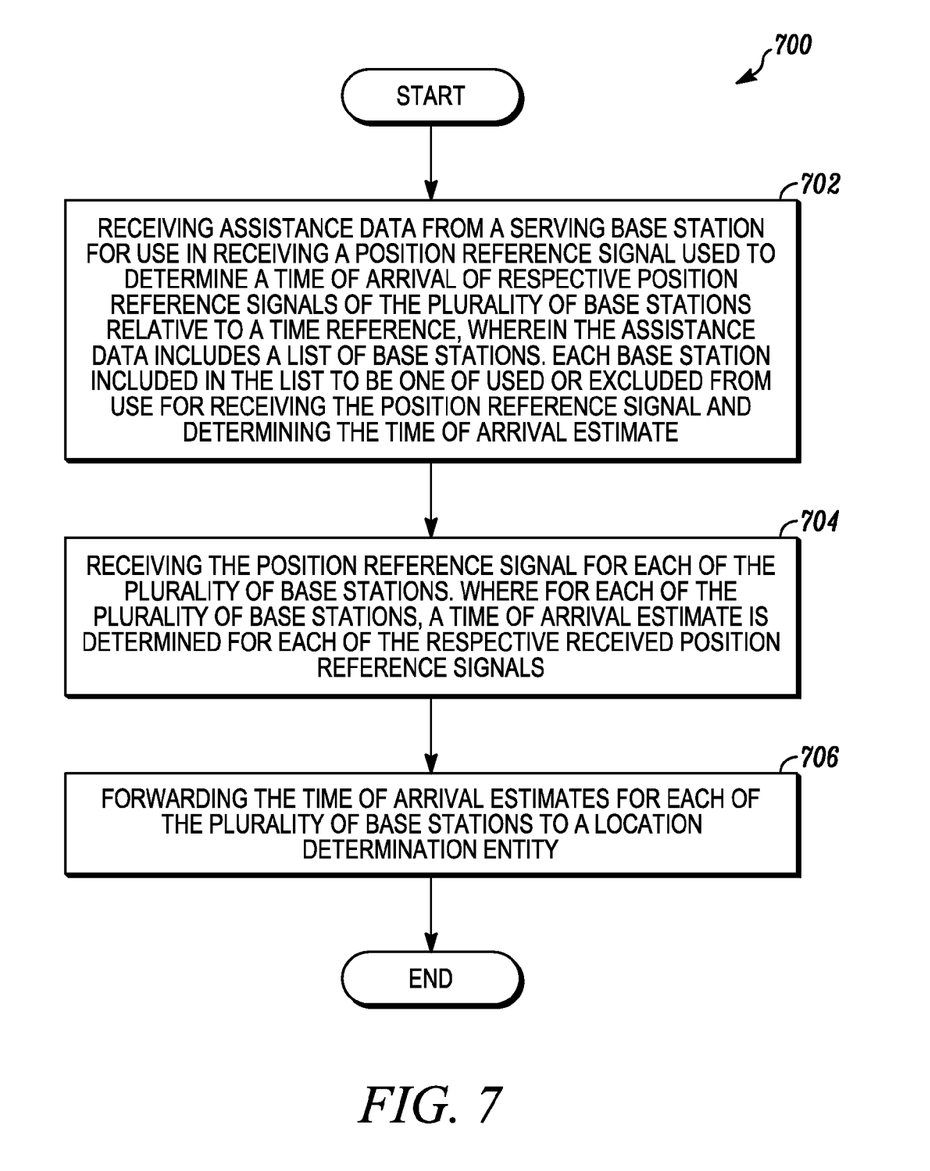
FIG. 7 is a flow diagram of a method for use in a location determination approach using time of arrival estimates between the wireless terminal and a plurality of base stations in a cellular network.

FIG. 7 illustrates a flow diagram of a method 700 for use in a location determination approach using time of arrival estimates between the wireless terminal and a plurality of base stations in a cellular network. More specifically, the method involves a method in a wireless terminal The method 700 includes receiving 702 assistance data from a serving base station for use in receiving a position reference signal used to determine a time of arrival of respective position reference signals from the plurality of base stations relative to a time reference, wherein the assistance data includes a list of base stations, each base station included in the list to be one of used or excluded from use as part of the plurality of base stations for receiving the position reference signal and determining the time of arrival estimate for the received position reference signal. The position reference signal is then received 704 for each of the plurality of base stations, where for each of the plurality of base stations a time of arrival estimate is determined for each of the respective received position reference signals. The time of arrival estimates for each of the plurality of base stations is then forwarded 706 to a location determination entity.

Figure 8:
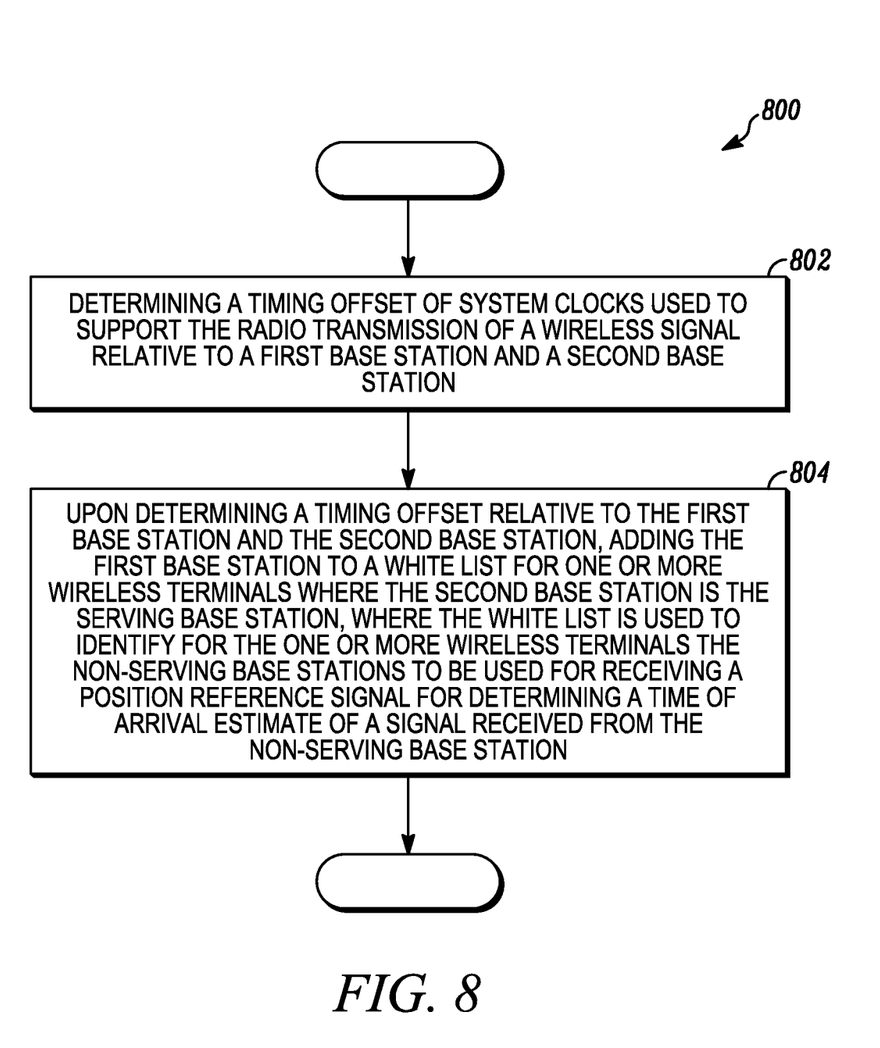
FIG. 8 is a more detailed flow diagram of a method in accordance with FIG. 7, where a base station is added to a white list in response to determining a timing offset of system clocks between respective base stations.

FIG. 8 illustrates a more detailed flow diagram of a method 800 in accordance with FIG. 7, where a base station is added to a white list in response to determining a timing offset of system clocks between respective base stations. More specifically, the method 800 further includes determining 802 a timing offset of system clocks used to support the radio transmission of a wireless signal relative to a first base station and a second base station. Upon determining a timing offset relative to the first base station and the second base station, the first base station is added 804 to a white list for one or more wireless terminals where the second base station is the serving base station, where the white list is used to identify for the one or more wireless terminals the non-serving base stations to be used for receiving a position reference signal for determining a time of arrival estimate of a signal received from the non-serving base station.

Figure 9:
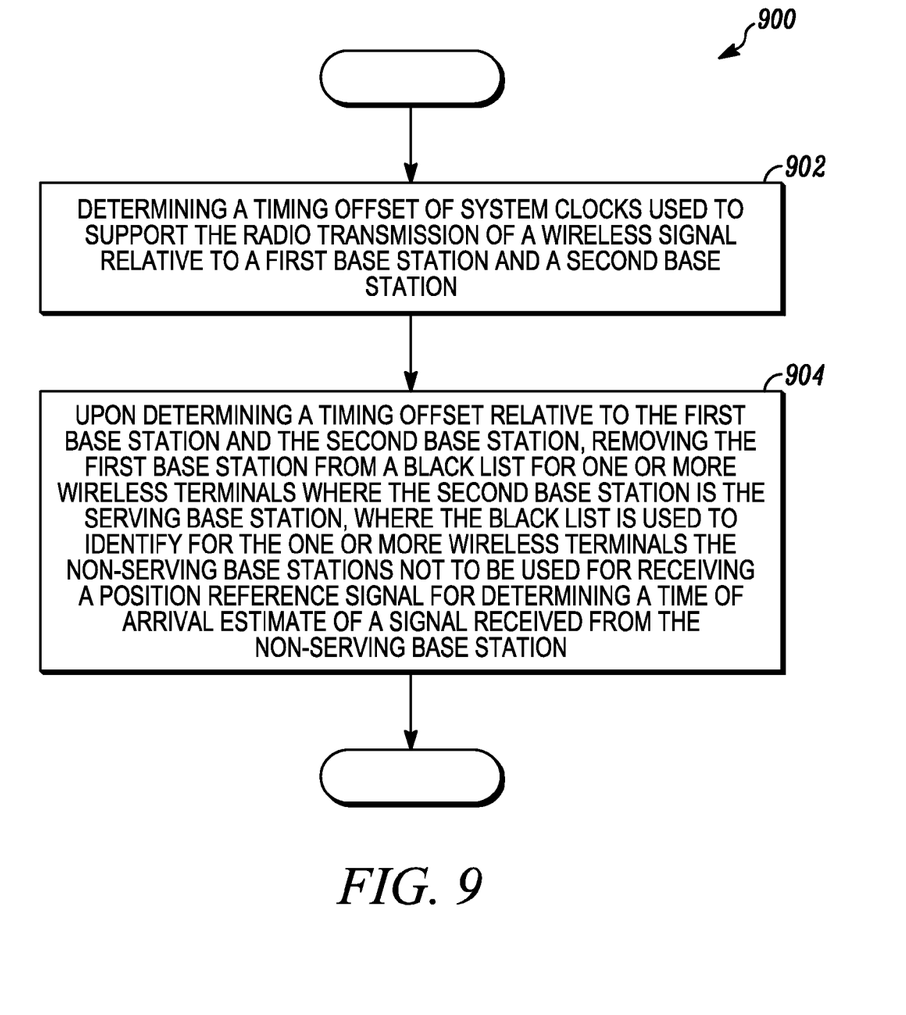
FIG. 9 is a more detailed flow diagram of a method in accordance with FIG. 7, where a base station is removed from a black list in response to determining a timing offset of system clocks between respective base stations.

FIG. 9 illustrates a more detailed flow diagram of a method 900 in accordance with FIG. 7, where a base station is removed from a black list in response to determining a timing offset of system clocks between respective base stations. More specifically, the method 900 further includes determining 902 a timing offset of system clocks used to support the radio transmission of a wireless signal relative to a first base station and a second base station. Upon determining a timing offset relative to the first base station and the second base station, the first base station is removed 904 from a black list for one or more wireless terminals where the second base station is the serving base station, where the black list is used to identify for the one or more wireless terminals the non-

What is claimed is:

1. A method in a wireless terminal for use in a location determination approach using time of arrival estimates between the wireless terminal and a plurality of base stations in a cellular network, the method comprising:
receiving assistance data from a serving base station for use in receiving a position reference signal used to determine a time of arrival of respective position reference signals from the plurality of base stations relative to a time reference, wherein the assistance data includes a list of base stations, each base station included in the list to be one of used or excluded from use as part of the plurality of base stations for receiving the position reference signal and determining the time of arrival estimate for the received position reference signal, and wherein the assistance information includes a white list of base stations, which includes base stations other than the serving base station to be used for receiving a position reference signal and determining a time of arrival estimate for the received position reference signal, where the white list includes base stations in addition to base stations from other received lists of neighbor base stations that are received as part of a message from the serving base station;
receiving the position reference signal for each of the plurality of base stations, where for each of the plurality of base stations a time of arrival estimate is determined for each of the respective received position reference signals; and
forwarding the time of arrival estimates for each of the plurality of base stations to a location determination entity.

2. A method in accordance with claim 1, wherein the white list includes base stations which are unavailable to the wireless terminal for establishing a communication connection, but are available for receiving a position reference signal therefrom.

3. A method in accordance with claim 1, wherein the message from the serving base station having a neighbor list is part of a message from the serving base station used for mobility measurements.

4. A method in accordance with claim 1, wherein the assistance information includes a black list of base stations, which includes base stations to be excluded from use for receiving a position reference signal and determining a time of arrival estimate for the received position reference signal.

5. A method in accordance with claim 4, wherein the black list includes base stations to be subtracted from other received lists of neighbor base stations.

6. A method in accordance with claim 1, wherein the position reference signal is a signal dedicated to determining a time of arrival estimate at a wireless terminal from a base station for use in determining the location of the wireless terminal.

7. A method in accordance with claim 1, wherein the location determination entity is a location server.

8. A method in accordance with claim 1, wherein the position reference signal is encoded as part of an OFDM downlink data channel.

9. A method in accordance with claim 1, wherein the cellular network is a Long Term Evolution (LTE) cellular network.

10. A method in accordance with claim 1, wherein the wireless terminal is a radio telephone.

11. A method in accordance with claim 1, further comprising determining a timing offset of system clocks used to support the radio transmission of a wireless signal relative to a first base station and a second base station;
wherein upon determining a timing offset relative to the first base station and the second base station, adding the first base station to the white list for one or more wireless terminals where the second base station is the serving base station, where the white list is used to identify for the one or more wireless terminals the non-serving base stations to be used for receiving a position reference signal for determining a time of arrival estimate of a signal received from the non-serving base station.

12. A method in accordance with claim 1, wherein the list of base stations included as part of the assistance data is transmitted as part of a system information broadcast signal.

13. A method in accordance with claim 1, wherein the list of base stations included as part of the assistance data is transmitted as part of a radio resource control message communicated to one or more wireless terminals.

14. A wireless terminal for use in a cellular wireless communication network having multiple base stations including a serving base station, the wireless terminal comprising:
a transceiver including a transmitter and a receiver;
a timer for maintaining a local time reference; and
a controller coupled to the transceiver and the timer, the controller including:
a location determination module adapted for managing the receipt of assistance data from the serving base station for determining a timing relationship between the time reference for each of a plurality of base stations and the local time reference, wherein the assistance data includes a list of base stations, each base station included in the list to be one of used or excluded from use for receiving a position reference signal and determining a time of arrival estimate for the received position reference signal, and wherein the assistance information includes a white list of base stations, which includes base stations other than the serving base station to be used for receiving a position reference signal and determining a time of arrival estimate for the received position reference signal, where the white list includes base stations in addition to base stations from other received lists of neighbor base stations that are received as part of a message from the serving base station; managing the receipt of a plurality of respective position reference signals, via the transceiver, the position reference signals each having a time of receipt within the wireless terminal; calculating a time of arrival estimate for each of the received position reference signals from the determined timing relationship and received position reference signal for each of the plurality of base stations; and managing the transmission of the time of arrival estimate for each of the plurality of base stations to a location determination entity.

15. A wireless terminal in accordance with claim 14, further comprising a memory storage unit coupled to the controller, which is adapted for storing received assistance data.

16. A wireless terminal in accordance with claim 15, wherein the memory storage unit is further adapted for storing one or more sets of prestored instructions for execution by the controller, including a set of prestored instructions for the location determination module.

17. A method in a wireless terminal for use in a location determination approach using time of arrival estimates between the wireless terminal and a plurality of base stations in a cellular network, the method comprising:
    receiving assistance data from a serving base station for use in receiving a position reference signal used to determine a time of arrival of respective position reference signals from the plurality of base stations relative to a time reference, wherein the assistance data includes a list of base stations, each base station included in the list to be one of used or excluded from use as part of the plurality of base stations for receiving the position reference signal and determining the time of arrival estimate for the received position reference signal, and wherein the assistance information includes a black list of base stations, which includes base stations to be excluded from use for receiving a position reference signal and determining a time of arrival estimate for the received position reference signal, where the black list includes base stations to be subtracted from other received lists of neighbor base stations that are received as part of a message from the serving base station;
    receiving the position reference signal for each of the plurality of base stations, where for each of the plurality of base stations a time of arrival estimate is determined for each of the respective received position reference signals; and
    forwarding the time of arrival estimates for each of the plurality of base stations to a location determination entity.

18. A method in accordance with claim 17, wherein the assistance information includes a white list of base stations, which includes base stations to be used for receiving a position reference signal and determining a time of arrival estimate for the received position reference signal.

19. A method in accordance with claim 18, wherein the white list includes base stations in addition to base stations from other received lists of neighbor base stations.

20. A method in accordance with claim 17, wherein the list of base stations included as part of the assistance information includes a list of communication cell identifiers, which includes identifiers for communication cells to be one of used or excluded from use for receiving a position reference signal and determining a time of arrival estimate for the received position reference signal.

21. A method in accordance with claim 20, wherein the communication cells to be excluded includes one or more respective subsets of one or more sets of communication cells having signals that originate from the same location.

22. A method in accordance with claim 17, further comprising determining a timing offset of system clocks used to support the radio transmission of a wireless signal relative to a first base station and a second base station;
    wherein upon determining a timing offset relative to the first base station and the second base station, removing the first base station from the black list for one or more wireless terminals where the second base station is the serving base station, where the black list is used to identify for the one or more wireless terminals the non-serving base stations not to be used for receiving a position reference signal for determining a time of arrival estimate of a signal received from the non-serving base station.

23. A wireless terminal for use in a cellular wireless communication network having multiple base stations including a serving base station, the wireless terminal comprising:
    a transceiver including a transmitter and a receiver;
    a timer for maintaining a local time reference; and
    a controller coupled to the transceiver and the timer, the controller including:
        a location determination module adapted for managing the receipt of assistance data from the serving base station for determining a timing relationship between the time reference for each of a plurality of base stations and the local time reference, wherein the assistance data includes a list of base stations, each base station included in the list to be one of used or excluded from use for receiving a position reference signal and determining a time of arrival estimate for the received position reference signal, and wherein the assistance information includes a black list of base stations, which includes base stations to be excluded from use for receiving a position reference signal and determining a time of arrival estimate for the received position reference signal, where the black list includes base stations to be subtracted from other received lists of neighbor base stations that are received as part of a message from the serving base station; managing the receipt of a plurality of respective position reference signals, via the transceiver, the position reference signals each having a time of receipt within the wireless terminal; calculating a time of arrival estimate for each of the received position reference signals from the determined timing relationship and received position reference signal for each of the plurality of base stations; and managing the transmission of the time of arrival estimate for each of the plurality of base stations to a location determination entity.

* * * * *